UNITED STATES PATENT OFFICE.

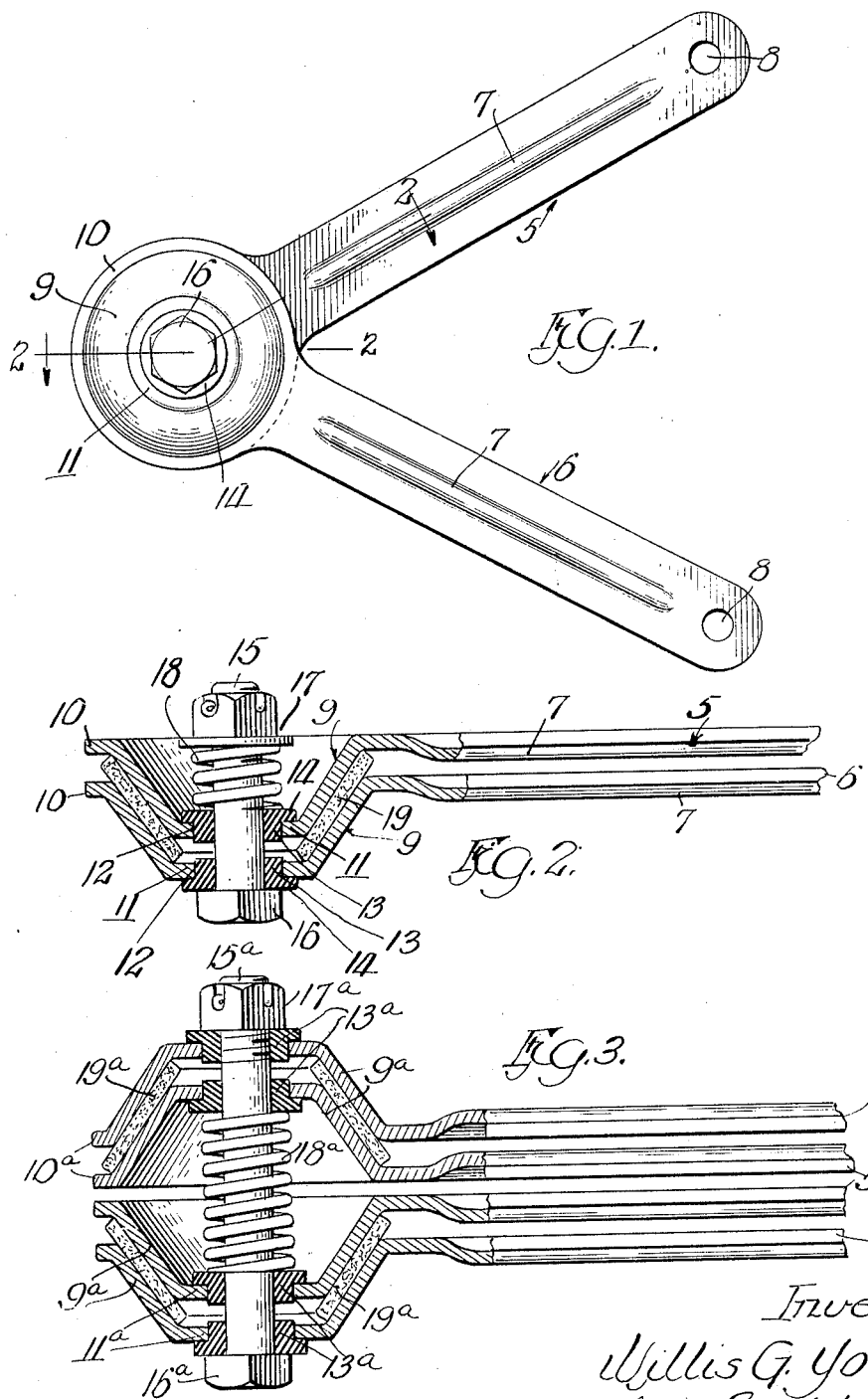

WILLIS G. YOUNG, OF CHICAGO, ILLINOIS.

SHOCK-ABSORBER FOR VEHICLES.

1,372,327.     Specification of Letters Patent.     Patented Mar. 22, 1921.

Application filed November 24, 1919. Serial No. 340,297.

*To all whom it may concern:*

Be it known that I, WILLIS G. YOUNG, a citizen of the United States, and a resident of Chicago, in the county of Cook and State of Illinois, have invented certain new and useful Improvements in Shock-Absorbers for Vehicles; and I do hereby declare that the following is a full, clear, and exact description thereof, reference being had to the accompanying drawings, and to the letters of reference marked thereon, which form a part of this specification.

This invention relates to improvements in shock absorbers for vehicles, and consists of the matters hereinafter described and more particularly pointed out in the appended claims.

The object of the invention is to provide a simple and efficient shock absorber more particularly for motor vehicles, comprising comparatively few parts which may be quickly and easily assembled, which are so constructed and arranged that they provide for a large frictional engagement area, without unduly enlarging said parts and which will readily compensate for such wear as may occur. The object, as well as the several advantages of the invention, will be more apparent as I proceed with my specification.

In the drawings:

Figure 1 illustrates a view in side elevation of my improved shock absorber.

Fig. 2 illustrates on an enlarged scale, a fragmentary horizontal section through the same, the plane of the section being indicated by the line 2—2 of Fig. 1.

Fig. 3 illustrates a view similar to that shown in Fig. 2, of a modified or duplex form of my invention.

Referring now in detail to that embodiment of the invention more particularly illustrated in Figs. 1 and 2 of the accompanying drawings, 5 and 6 indicate respectively, the top and bottom arms of the shock absorber, which are pivotally connected together at one end and are each adapted to be pivotally attached at their other ends to the frame and axle or spring respectively, of a vehicle. Said arms are identical in form and are preferably stamped out of sheet metal. Each arm includes an elongated body having a longitudinal stiffening rib 7 and at one end of said body is provided a hole 8, for pivotal attachment to the vehicle frame or spring and at the other end of said body is provided an enlarged, hollow, truncated, conical head 9. At the larger or base end of each head is provided an outwardly extending radial flange 10, forming a continuation of the elongated body of the arm, and at the smaller or peak end of said head is provided an inwardly extending radial flange 11, which defines a hole 12 coaxial with the head as a whole.

In each hole 12 is inserted, a bearing sleeve 13, having a flange 14 which engages against the inner and outer surfaces of the flange 11 of the associated nesting heads 9. A bolt 15 extends through said sleeves, with its head 16 engaging the outer surface of the flange 14, of the bottom arm 6, the other end of said bolt carrying a washer and nut 17, and surrounding said bolt between said washer and the sleeve 13, of the top arm 5 is a coiled expansion spring 18, which tends to yieldingly hold the heads 9 of both arms in a close nesting relation.

Between the conic heads 9 of both arms is interposed a free or floating friction member 19, in the form of a conic leather ring which engages at one end against the flanges 10 of the arm 5 and engages at its other end against the flange 11 of the arm 6. This ring presents both of its friction surfaces to the inner and outer surfaces of the respective heads and as it becomes worn away, the spring 18 will move said heads into closer nesting engagement and compensate for such wear.

In operation, as the arms 5 and 6 approach each other in the rotative movement about the pivot bolt 15, the friction ring will adhere to one or the other of said heads, and frictionally engage the other of said heads to resist the rotative movement between said arms. Sometimes the friction ring will adhere to the head 9 of the top arm 5 so as to present a friction surface to the head 9 of the bottom arm 6, in the relative movement between said arms and sometimes said friction ring will adhere to the head of the bottom arm to present a friction surface to the head of the top arm. In this movement the ring will creep circumferentially so that there will be a relative movement between said heads and ring. By means of this creeping movement the wear of frictional engagement is not confined to one particular spot or area on the ring as occurs when the ring is fixed to one or the other of said heads, but said wear is evenly distributed about the whole inner and outer surface areas of the ring so that it may be compensated for or taken up by the action of the spring 18. Thus in this construction two friction surfaces are provided for by one friction ring instead of only one friction surface which is the case when the ring is fixed to one or the other of said heads, and as the ring changes its relative rotative position or engagement with respect to the heads, the life of the ring is increased and the necessity of frequent renewals is materially reduced.

In Fig. 3, I have illustrated a modified or duplex form of construction for heavy vehicles such as motor trucks and the like, and therein the arms 5 and 6 are provided in duplicate. As shown two inner arms 5ª and two outer arms 6ª are employed, the heads 9ª of said inner arms, nesting in the heads of the outer arms, there of course being a friction ring 19ª interposed between the associated heads. In this case, the bolt 15ª passes through sleeves 13ª in said heads, the heads of said bolt engaging on the outer side of one outer head and the nut 17ª on the outside of the other outer head, and a coiled expansion spring 18ª surrounds the bolt 15ª between the sleeves 13ª of the heads 9ª of the inner arm 5ª. Said spring acts to yieldingly hold the heads in engagement with the rings 19ª. By tightening the nut 17ª, the tension of the spring may be increased, thus increasing the friction between the heads of the inner and outer arms 5ª and 6ª respectively.

It is apparent that my improved shock absorber possesses many advantages over those now on the market for a similar purpose. The arms though made of sheet metal are strong and rigid owing to the flange and rib construction. The shock absorber consists of but a few parts which may be easily assembled and which readily adjust themselves to compensate for wear. By employing the conic form of head, the friction area is materially increased without unduly enlarging the size of the heads and by employing a friction ring which is not fixed to either head, the advantage of two friction surfaces is gained instead of one friction surface as embodied in other constructions for a similar purpose. Other advantages to be gained by the use of identically formed parts are, the necessity of making only one stamping die to form the arms and the interchangeability of the parts, so that when the adjacent operative surfaces of the head become worn or sand scored, the arms may be reversed so that the outer surface of the former outer arm and the inner surface of the former inner arm may be changed about to be bought into a nesting operative relation with each other to provide new surface to co-act with the friction ring.

While in describing my invention, I have referred to certain details of form, construction and arrangement of parts, I do not wish to be limited thereto, except as is pointed out in the appended claims.

I claim as my invention:

1. A shock absorber comprising, a plurality of arms, said arms having identically formed hollow, truncated, conical, apertured heads, the head of one of said arms nesting in the head of the associated arm, a free friction ring interposed between the adjacent surfaces of said nesting heads, a pivot bolt extending through the apertures in said heads, and means acting to yieldingly hold said heads in engagement with said friction ring.

2. A shock absorber comprising, a plurality of arms, said arms having identically formed hollow, truncated, conical, apertured heads, the head of one of said arms nesting in the head of the associated arm, a free friction ring interposed between the adjacent surfaces of said heads, a bearing sleeve in each head, a pivot bolt extending through said sleeves, a spring on said bolt yieldingly holding said heads in engagement with said friction ring, and means for retaining said spring on said bolt.

3. A shock absorber comprising, a plurality of sheet metal arms each consisting of an elongated body and of a head, the heads of all of said arms being identically formed hollow, truncated, conical heads, each head having an outwardly extending radial flange at its larger end forming a continuation of said body and having an inwardly extending flange at its smaller end defining an aperture, the head of one arm nesting in the head of an associated arm, a free friction ring interposed between the adjacent surfaces of said heads, a flanged bearing sleeve in each aperture, a pivot bolt extending through said sleeves, a spring on said pivot bolt yieldingly holding said heads in engagement with said friction ring, and means for retaining said spring on said bolt.

In testimony that I claim the foregoing as my invention, I affix my signature in the presence of two witnesses, this 20th day of November, A. D. 1919.

WILLIS G. YOUNG.

Witnesses:
 HERMAN WOOTTON,
 ERIC SAMUELSON.